United States Patent [19]

Hall

[11] 3,715,957
[45] Feb. 13, 1973

[54] APPARATUS FOR COMPACTING FILTER TIP ASSEMBLIES

[75] Inventor: Floyd V. Hall, Durham, N.C.

[73] Assignee: Liggett & Myers Incorporated, New York, N.Y.

[22] Filed: Dec. 28, 1970

[21] Appl. No.: 101,802

[52] U.S. Cl. ................................. 93/1 C, 131/94
[51] Int. Cl. ............................. B31d 3/00, A24c 5/48
[58] Field of Search .......... 93/1 C; 131/94; 141/80; 100/264, 244, 292

[56] References Cited

UNITED STATES PATENTS 3,009,413  11/1961  Alexander et al. ............... 100/244 X
3,354,887  11/1967  Hall ................................. 93/1 C X
3,517,480  6/1970  Pinkham .......................... 93/1 C X Primary Examiner—Frank T. Yost
Assistant Examiner—Leon Gilden
Attorney—Kenyon & Kenyon Reilly Carr & Chapin

[57] ABSTRACT

The plates contain pressure pads about the peripheries and each is mounted in angular relationship to the cigarette transfer drum and is rotatable along with the transfer drum. The pressure pads are arranged in opposed pairs to converge towards each other as the plates rotate so as to compact charges of granular material within a multi-section filter tip assembly located at the point of conveyance.

21 Claims, 6 Drawing Figures

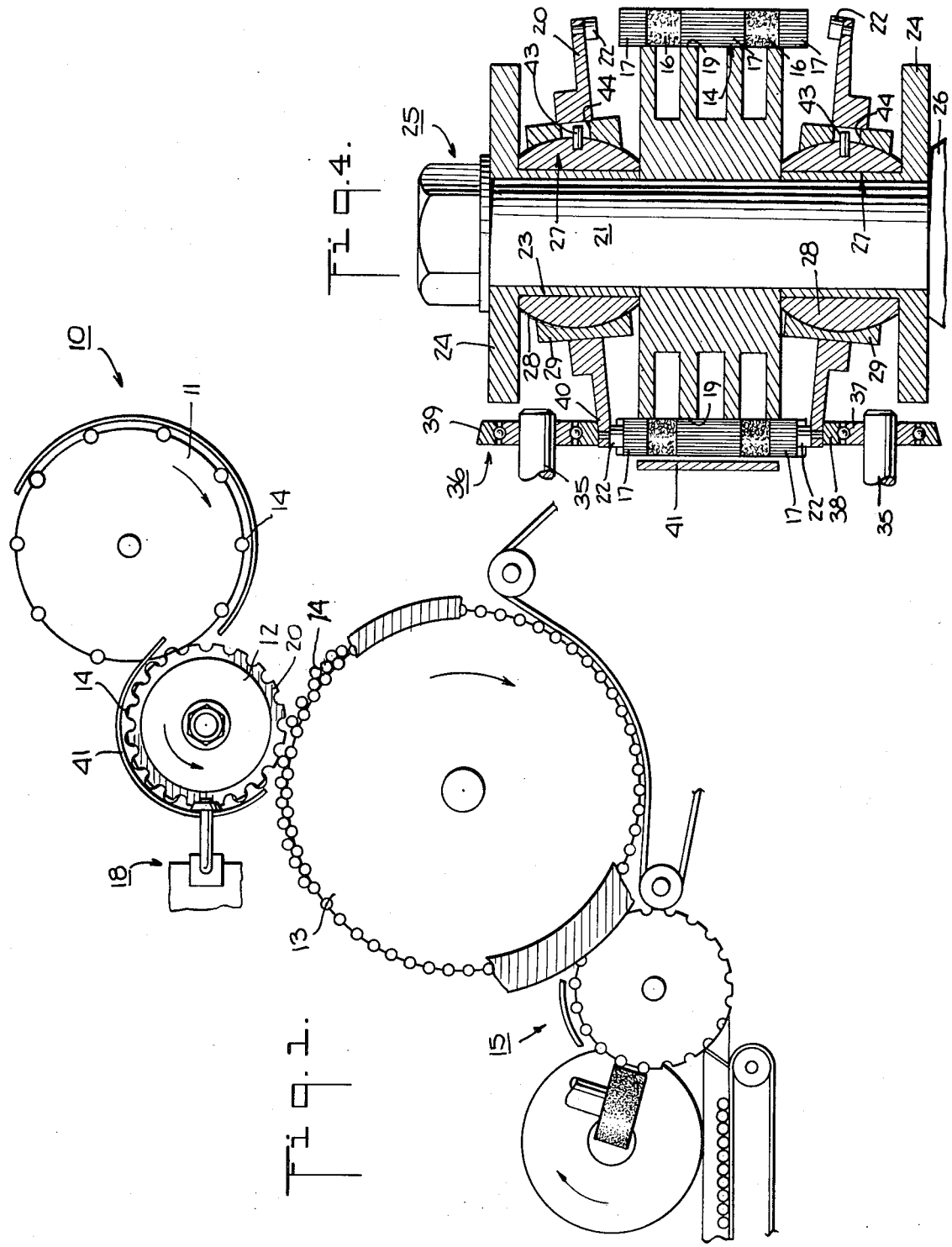

INVENTOR
FLOYD V. HALL
ATTORNEYS

INVENTOR.
FLOYD V. HALL

APPARATUS FOR COMPACTING FILTER TIP ASSEMBLIES

This invention relates to an apparatus for compacting filter tip assemblies. More particularly, this invention relates to an apparatus for compacting cigarette filter tip assemblies containing sections of granular filter tip material therein.

Multi-sectional filter tip assemblies have been known in which sections of granular adsorption type filter materials have been located between sections of entrainment type filter materials. It has also been known to compact such multi-sectional filter tip assemblies after an initial assembly operation to reduce the space occupied by the granular adsorption type filter materials within the filter tip assemblies in order to more efficiently utilize these materials for filtering purposes, for example, as described in U.S. Pat. No. 3,544,887. In order to carry out such a compaction operation, various devices have been devised to press in at the ends of the filter tip assemblies so as to push the entrainment type filter sections or plugs of material at these ends inwardly in order to reduce the volume of the granular material sections. In some instances, these devices have relied upon the use of pad carrying resilient compaction arms which have been moved against the ends of the filter tip assemblies when the assemblies have been positioned at predetermined stations within a continuous stream and which have been allowed to spring away from the ends of the assemblies immediately after compaction so as not to interfere with continued movement of the cigarette assemblies. However, because of the resilient nature of these compacting arms, there has been a possibility that the arms will fatigue after extended periods of use and time so that replacement will become necessary. Also, in some instances, the compaction arms have been mounted at points spaced from the machine elements transferring the filter tip assemblies from one station to another such that the operation of the devices have required synchronization, as by a suitable transmission, with the remainder of the machine elements.

Accordingly, it is an object of this invention to provide a compacting apparatus which is not subjected to fatigue.

It is another object of the invention to provide a compacting apparatus of extended life.

It is another object of the invention to provide a compacting apparatus which is simple in construction and which can be adapted to existing machines.

It is another object of the invention to provide a compacting apparatus which is adjustable so as to effect different degrees of compaction.

Briefly, the invention is directed to an apparatus for compacting filter tip assemblies having granular filter material sections between entrainment type filter material sections which includes a pair of plate means, each of which has at least one pressure pad thereon for engaging the ends of a filter tip assembly, and a means for disposing each plate means in angular relationship to each other so as to bring the pressure pad means toward each other at a predetermined position wherein a filter tip assembly is positioned so as to exert a compacting force on the filter tip assembly.

Each plate means is adapted to cooperate with a cigarette transfer drum onto which a sequential series of filter tip assemblies are deposited into spaced grooves on the periphery of the transfer drum. In this respect, each plate means is in the form of a plate which is mounted on the shaft of transfer drum on an opposite side of the drum so as to rotate therewith and the pressure pads of the plates are aligned with the grooves in the transfer drum so as to be within the projected plane of the filter tip assemblies disposed within the grooves of the drum. In addition, the means for disposing the plates in angular relationship to the common axis of the shaft and transfer drum act on the plates at predetermined positions in the rotational path of the plates so that during rotation with the drum, the various pressure pads on the plates move in a path between a point where the opposed pair of pressure pads are in a convergent position and a point in which the opposed pressure pads are in a divergent position. In the convergent position, the pressure pads are pressed into the filter tip assembly coincident therewith to exert a force on the plugs of the entrainment type filter material disposed at the ends of the assembly so as to move the plugs inwardly while compacting the granular filter materials therebetween.

In one embodiment, the means to dispose the plates in angular relationship to the transfer drum include a pair of cam means disposed on opposite sides of the drum in abutment with the respective plate means. Each cam means is constructed of cams having an outer peripheral surface in mating engagement with a surface of the plate so that as the plate rotates, the cam causes the plate to tilt about the axis of the transfer drum. The cams are also rotatable so as to rotate along with the plates and, to this end, the outer surface of the cam can be tapered while the axis of the cam is disposed in perpendicular relationship to the axis of the transfer drum shaft. In addition, the cams are mounted on suitable supports secured to the frame of the cigarette transfer machine.

In order to mount the plates on the shaft of the transfer drum, various assemblies can be used. For example, in one embodiment, a knuckle joint or spherical bearing can be used. In this instance, the inner race of the bearing can be secured in fixed relation to the shaft of the transfer drum as by a flanged bushing while the outer race is fixedly secured in concentric manner within the plate means. In order to ensure a positive driving connection between the inner race of the bearing and the plate, a pin is disposed between the inner race and the outer race of the bearing so that the outer race will rotate with the inner race. Alternatively, a plurality of dog pins can be fixedly secured to the flange of the bushing and project through suitable apertures in the plate. In this instance, the pins positively drive the plate while sliding relative to the plate through the apertures therein.

In another embodiment, the plates can be concentrically mounted with a clearance about a flanged bushing secured to the transfer drum shaft while a plurality of dog pins project from the flange through apertures in the plates to positively drive the plates along with the transfer drum shaft. In addition, in order to permit each plate to maintain the inclined position with respect to the transfer drum, a plurality of springs cooperate with the cam means to resiliently mount each plate. In this case, the springs are secured at the ends between the flange of the bushing and the plate such that in the half portion of the plate which is adjacent the convergent position of the pressure pads, the springs are stretched while in the remaining half section, the springs are compressed.

Since the plates do not undergo any flexing or distortional forces as they are merely canted with respect to the transfer drum and rotate along with the drum, the plates can be made of any suitable rigid material such as metal. In addition, the plates can be shaped in any suitable configuration such as a flat annular shape with the pressure pads being secured at the periphery by suitable means.

It is further noted that immediately prior to and subsequently after compaction of the filter tip assemblies the pressure pads are located outside the filter tip assembly due to the angular rotation of the plates relative to the transfer drum. However, within the area in which the plates are in the convergent position, the pressure pads project into the plane of the filter tip assembly so as to compact the materials within the wrapper of the filter tip assembly.

These and other objects and advantages of the invention will become more apparent from the following detailed description and appended claims taken in conjunction with the accompanying drawings in which:

FIG. 1 illustrates a side elevational view of a cigarette filter tip attachment machine utilizing an apparatus of this invention;

FIG. 4 illustrates a view of a modified apparatus similar to the view as shown in FIG. 3;

Figure 3:
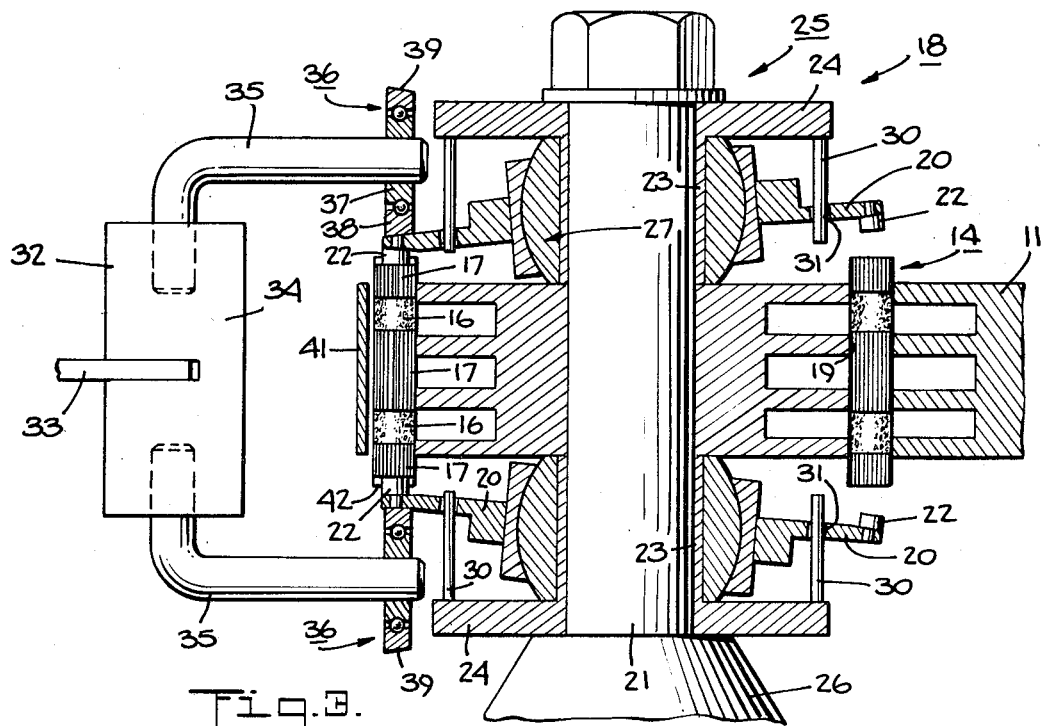
FIG. 3 illustrates a view taken on line 3—3 of FIG. 2.

Referring to FIG. 1, the cigarette filter tip attachment machine 10 includes a plurality of filter tip separating drums 11 (only one of which is shown), a filter tip alignment and transfer drum 12 which rotates in the direction indicated by the arrow thereon, a cigarette assembly drum 13 which receives filter tip assemblies 14 from the alignment drum 12 for the assembly of a completed cigarette and carries the assemblies to a cutting drum assembly 15 as is known. The various structural details of these various drums and assemblies are known and therefore no further description is believed to be necessary. Each filter tip assembly 14 (FIG. 3) includes a pair of sections 16 of granular adsorption type filter material, such as charcoal, and alternate sections 17 of entrainment type filter material such as plugs of cellulose acetate.

In order to compact the sections 16 of granular material, a compacting apparatus 18 is positioned on the transfer drum 12 to compact each filter tip assembly received on the drum 12 from the separating drums 11 in sequence.

Figure 2:
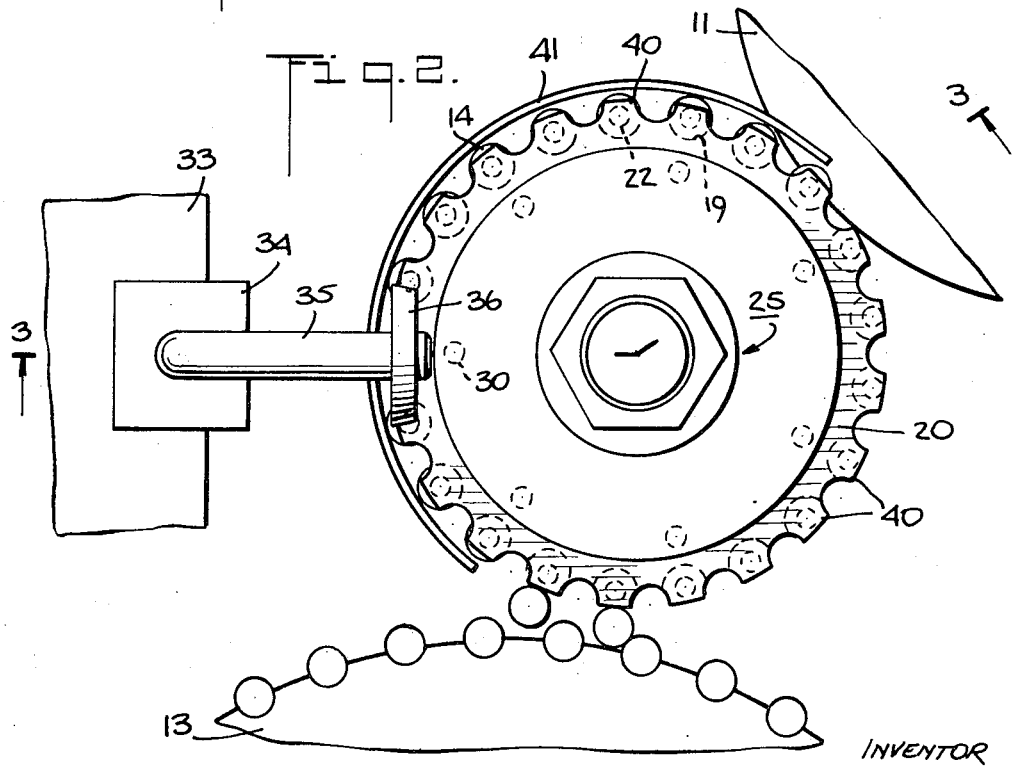
FIG. 2 illustrates an enlarged view of the compacting apparatus of the invention.

Referring to FIGS. 1, 2 and 3, the transfer drum 12 has a plurality of circumferentially spaced peripheral grooves 19 for receiving the filter tip assemblies 14 therein. The compacting apparatus 18 includes a pair of plates 20 which are rotatably mounted on a shaft 21 of the transfer drum 12 in inclined angular relationship to the transfer drum 12. Each plate 20 is of angular shape and has a plurality of pressure pads 22 secured thereon in spaced circumferential array and in alignment with the grooves 19 in the transfer drum 12. In addition, in order to mount the plates 20 on the shaft 21, a bushing 23 which has an annular flange 24 thereon is secured to the shaft 21 on opposite sides of the drum 12 for rotation therewith. For example, each bushing 23 is slidably mounted by a splined connection (not shown) on the transfer drum shaft 21 and held in place between a threaded nut and washer assembly 25 and an abutment 26 of the machine 10. Each bushing 23 also carries a knuckle joint or spherical bearing 27 which includes an inner race 28 fixedly secured to the bushing 23 to rotate therewith and an outer race 29 mounted in universal relation on a spherical surface of the inner race 28. The outer race 29 is also secured concentrically within a respective plate 20. In order to drive the plates 20 along with the inner races 28 of the bearings 27, a plurality of circumferentially spaced dog pins 30 are fixed to the flange 24 of each bushing and pass through suitable apertures 31 in each respective plates 20. The pins 30 are sized to extend through the plates 20 an amount sufficient to permit adjustments in the angular relationship of the plates 20 to the transfer shaft 21 depending upon the size of the filter tip assembly 14 being compacted on the transfer drum 12 without effecting the drive connection.

In order to dispose each plate in angular relationship to the transfer, drum the compacting apparatus 18 has a cam means 32 mounted on the frame 33 of the cigarette machine 10. This cam means 32 includes a block support 34, a pair of arms 35 extending from the support 34 and a pair of cam rollers 36 each of which is mounted on a respective arm 35. Each cam roller 36 is constructed of a ball bearing having an inner race 37 fixedly secured to an arm 35 and an outer race 38 which is in abutment with a respective plate 20. The outer surface 39 of the outer race 38 is further beveled so as to mate with the surface of the plate 20. In addition, the rotational axis of each cam roller 36 is disposed in perpendicular relationship to the rotational axis of the transfer drum shaft 21. In this way, a smooth transfer of traction force between the cam roller 36 and the rotating plates 20 is facilitated. The cam rollers 36 are positioned to tilt the plates 20 from planes perpendicular to the axis of the shaft 22 so as to converge the two plates 20 towards each other at a predetermined position while simultaneously diverging the plates 20 at a diametrically opposite point. The point of convergence is such as to permit a pair of opposed pressure pads 22 to be moved against the ends of a filter tip assembly 14 positioned therebetween in order to exert a compacting force on the filter tip assembly 14.

Referring to FIG. 2, each plate 20 is of generally annular construction with a plurality of digitated extensions 40 each of which has a pad 22 secured thereto, for example, as by a threaded screw (not shown) passing through each extension 40 into the pressure pads 22.

Referring to FIG. 3, each arm 35 of the cam means 32 is adjustably mounted within the block support 34 so as to move the respective cam rollers 36 farther or closer relative to each other, depending upon the length of the filter tip assembly 14 or upon the required degree of compaction of the granular material sections 16.

In operation, a filter tip assembly 14 is first received on an upper surface of the transfer drum 12 within a groove 19 (FIG. 1) and is thereafter carried about the transfer drum 14 in place. A sheet member 41 (FIGS. 1 to 4 and 6) of any suitable material is generally provided for suitably positioning the filter tip assembly 14 within the grooves 19 during rotation of the transfer drum 12. As the filter tip assembly 14 approaches the lower end of the drum 12, it passes through the convergent point of the plates 20 of the compaction apparatus 18. During passage through the convergent point, the plates 20 which are rotating along with the drum 12 are brought into convergence (FIG. 3) under the influence of the cam rollers 36 so that the pressure pads 22 in alignment with the groove 19 of the drum 12 are brought into bearing engagement with the plugs 17 of entrainment-type material sections at the ends of the filter tip assembly 14. Continued pressure of the pressure pads 22 against the ends of the filter tip assembly 14 cause the plugs 17 of entrainment sections to be pushed into the interior of the filter tip assembly 14 within the wrapper 42 of the filter tip assembly 14. This causes the volume of the granular material sections 16 within the filter tip assembly 14 to be reduced with a corresponding increase in the density of the granular material sections. The particles of the granular material are thus brought closer together so as to more completely fill the spaces between the sections 17 of the entrainment-type material. After compaction of the filter tip assembly 14 and continued rotation of the transfer drum 12 and plates 20, the pressure pads 22 are moved out of the plane of the wrapper 42 of the filter tip assembly 14 so as not to obstruct continued passage of the filter tip assembly 14 on the drum 12 toward the separating drum 13.

It is noted that during rotation of the plates 20 that each plate 20 moves longitudinally along the dog pins 30 while, at the same time, the dog pins 30 engage the plate 20 so as to positively drive the plates 20 along with the drum shaft 21.

Referring to FIG. 4 wherein like reference characters indicate like parts as above, the drive for the plates 20 can alternatively be provided by a pin 43 which is fixedly secured in the inner race 28 of the spherical bearing 27 and which is received in a laterally elongated slot 44 within the outer race 29 such that the outer race 29 is keyed to rotate with the inner race 28. The lateral elongation of the slot 44 allows the outer race 29 to be inclined to a greater or less degree with respect to the transfer drum 12 depending upon the position of the cam rollers 36 and the size of the filter tip assembly 14 being compacted.

Figure 6:
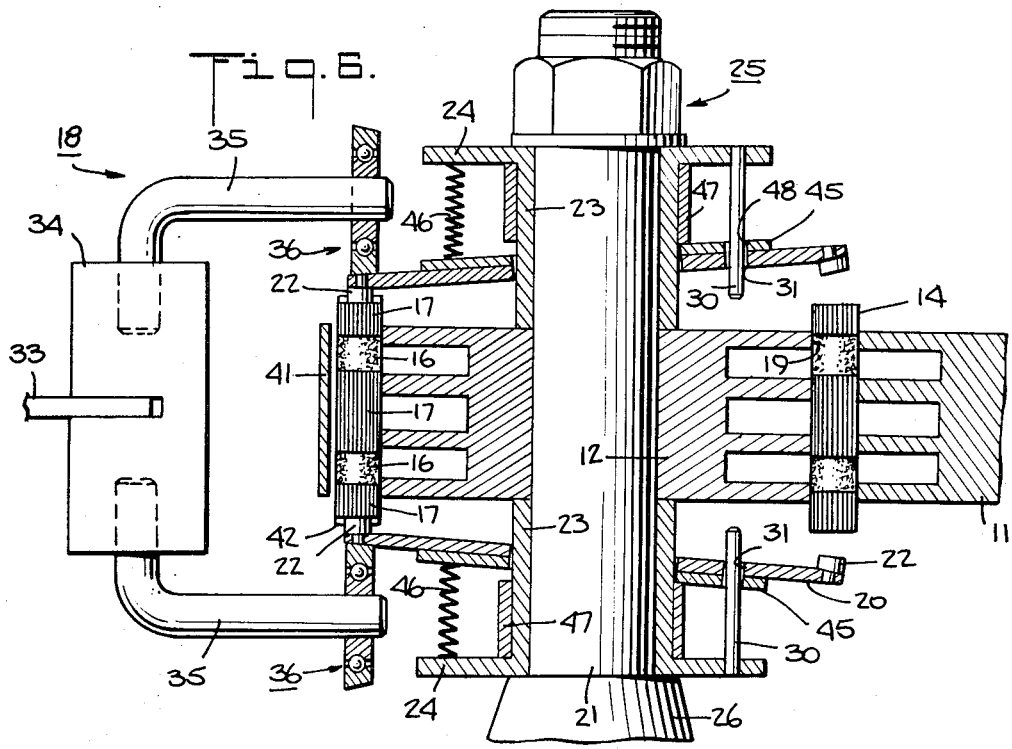
FIG. 6 illustrates a view taken on line 6-6 of FIG. 5.
Figure 5:
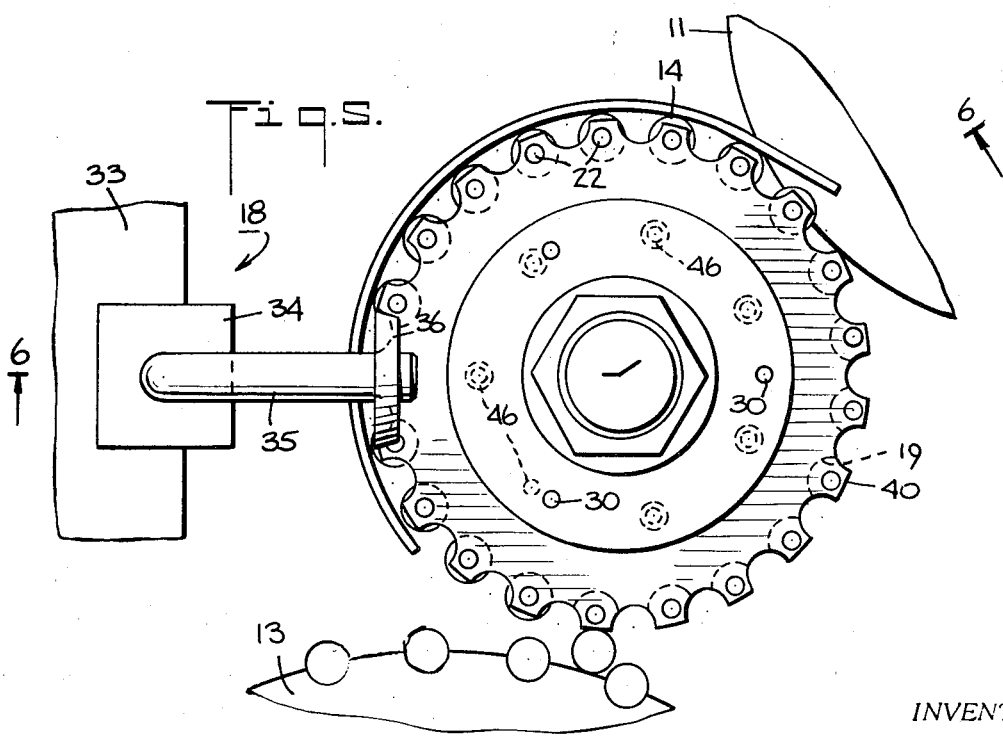
FIG. 5 illustrates a side view similar to FIG. 2 of a further modification of an apparatus according to the invention.

Referring to FIGS. 5 and 6, wherein like reference characters indicate like parts as above, each plate 20 can alternatively be mounted or fixed to a support plate 45 which is loosely mounted with a clearance about a flanged bushing 23. In order to maintain these plates 20 in an inclined relation to the transfer drum 12, a plurality of springs 46 such as coil springs are secured between the flange 24 of the bushing 23 and the support plate 45 fixed to the plates 20 and are arranged relative to the cam rollers 36 so that the springs 46 in one half of the plates 20 are in a stretched condition while the springs in the other half are in a compressed condition relative to a neutral position in which the plate would otherwise be parallel to the transfer drum.

In addition, an annular collar 47 is disposed about each bushing 23 between the flange 23 and the support plate 45 so as to limit the movement of each plate 20 from the transfer drum 12 towards the flanges 24. This resilient mounting of the plates 20 allows the plates to be moved relative to the transfer drum 12. In addition, a plurality of dog pins 30 are fixedly mounted in the flange 24 and pass through suitable apertures 48, 31 in each support plate 45 and plate 20.

The operation of the resiliently mounted plates 20 is similar to that as described above and therefore no further description is believed to be necessary.

The invention thus provides a compaction apparatus in which the compacting plates are free of flexing forces which would otherwise cause fatigue of the materials of the plates. In addition, the invention provides a compact apparatus which can be applied to shafts of the alignment and transfer drums of existing machinery in a simple efficient manner. Further, the invention provides a compaction apparatus which can be adjusted to the length of the filter tip assembly being compacted in a simple manner.

What is claimed is:

1. An apparatus for compacting filter tip assemblies comprising
   a rotatable shaft;
   a pair of plate means mounted on said shaft on a common axis of said shaft, each plate means having at least one pressure pad means thereon in aligned facing relation to a pressure pad means on the other of said plate means for receiving a filter tip assembly therebetween;
   means for rotating each said plate means with said shaft; and
   means for disposing each said plate means in angular relation to said common axis to bring each pressure pad means towards the other aligned pressure pad means at a predetermined position when a filter tip assembly is brought into alignment between said pressure pad means in said position to exert a compacting force on the filter tip assembly.

2. An apparatus as set forth in claim 1 wherein each plate means is of annular shape and includes a plurality of circumferentially spaced pressure pad means thereon.

3. An apparatus as set forth in claim 1 wherein said means includes a cam abutting each plate means to dispose each plate means in said angular relation to said axis.

4. An apparatus as set forth in claim 3 wherein said means further includes a bushing coaxially mounted relative to each said plate means having an annular flange thereon and a plurality of springs secured at the ends thereof between said plate means and said flange to permit resilient movement of said plate means relative to said flange, said flange being in opposed relation to said plate means.

5. An apparatus as set forth in claim 4 which further comprises a plurality of guide pins secured to each flange and passing through an adjacent plate means to rotate said plate means and flange in unison.

6. An apparatus as set forth in claim 3 wherein said means further includes a shaft and a pair of bearings fixedly mounted on said shaft, each bearing having an outer race secured to a respective plate means, an inner race mounting said outer race thereon in universal relation, and means for securing said outer race relative to said inner race for rotation therewith.

7. In combination with a rotatable shaft and a filter drum mounted on a longitudinal axis of said shaft and having a plurality of circumferentially spaced peripheral grooves for receiving filter tip assemblies therein; an apparatus for compacting a filter tip assembly in at least one of said grooves comprising a pair of plates mounted on said shaft coaxially of said drum, a plurality of circumferentially spaced pressure pads on each plate facing and in alignment with said grooves in said drum, means for rotating said plates with said drum, and cam means for disposing said plates in angular relation to said drum during rotation to bring a pair of opposed pressure pads towards an aligned groove therebetween to exert a compacting force on a filter tip assembly in said groove.

8. The combination as set forth in claim 7 wherein said means includes a pair of cams disposed on opposite sides of said drum, each cam being in abutment with a respective one of said plates to angularly dispose said plate about said axis of said drum to position said pair of opposed pressure pads against a filter tip assembly in said groove therebetween.

9. The combination as set forth in claim 8 wherein said cams are each rotatable.

10. The combination as set forth in claim 8 wherein said cams are each rotatable about an axis perpendicular to said axis of said drum.

11. The combination as set forth in claim 7 which further includes a pair of bushings fixed to said shaft on opposite sides of said drum, each bushing having a flange extending therefrom and a plurality of pins fixed to said flange and passing through a respective one of said plates to fixedly mount said plate for rotation with said shaft.

12. The combination as set forth in claim 11 which further includes a pair of bearings of opposite sides of said drum, each bearing having an inner race fixed to a respective bushing and an outer race universally mounted on said inner race, each said plate being fixedly mounted on a respective outer race of said bearings for pivoting relative to said flange longitudinally of said pins passing therethrough.

13. The combination as set forth in claim 11 which further includes a plurality of springs on each side of said drum, each spring being secured at the ends to a respective plate and a respective flange to permit resilient pivoting of each plate relative to said drum.

14. The combination as set forth in claim 7 which further includes a pair of bearings of opposite sides of said drum, each bearing having an inner race fixed to said shaft and an outer race universally mounted on said inner race, each said plate being fixedly mounted on a respective outer race of said bearings; and a pair of pins, each pin passing between a respective inner race and an outer race thereon to fixedly secure said outer race to said inner race for rotation therewith.

15. An apparatus for compacting filter tip assemblies comprising a pair of plate means rotatably mounted about a common axis, each plate means having at least one pressure pad means thereon in aligned facing relation to a pressure pad means on the other of said plate means for receiving a filter tip assembly therebetween; and means for disposing each said plate means in angular relation to said common axis to bring each pressure pad means towards the other aligned pressure pad means at a predetermined position when a filter tip assembly is brought into alignment between said pressure pad means in said position to exert a compacting force on the filter tip assembly, said means including a cam abutting each plate means to dispose each plate means in said angular relation to said axis, a bushing coaxially mounted relative to each said plate means having an annular flange thereon, and a plurality of springs secured at the ends thereof between each said plate means and each said flange to permit resilient movement of each said plate means relative to each said flange, each said flange being in opposed relation to each respective plate means.

16. An apparatus as set forth in claim 15 which further comprises a plurality of guide pins secured to each flange and passing through an adjacent plate means to rotate said plate means and flange in unison.

17. An apparatus for compacting filter tip assemblies comprising a pair of plate means rotatably mounted about a common axis, each plate means having at least one pressure pad means thereon in aligned facing relation to a pressure pad means on the other of said plate means for receiving a filter tip assembly therebetween; and means for disposing each said plate means in angular relation to said common axis to bring each pressure pad means towards the other aligned pressure pad means at a predetermined position when a filter tip assembly is brought into alignment between said pressure pad means in said position to exert a compacting force on the filter tip assembly, said means including a cam abutting each plate means to dispose each plate means in said angular relation to said axis, a shaft, a pair of bearings fixedly mounted on said shaft, each bearing having an outer race secured to a respective plate means, an inner race mounting said outer race thereon in universal relation, and means for securing said outer race relative to said inner race for rotation therewith.

18. In combination with a rotatable shaft, and a filter drum mounted on a longitudinal axis of said shaft and having a plurality of circumferential spaced peripheral grooves for receiving filter tip assemblies therein; an apparatus for compacting a filter tip assembly in at least one of said grooves comprising a pair of plates coaxially of said drum and fixedly mounted relative to said shaft to rotate simultaneously with said drum, a plurality of circumferentially spaced pressure pads on each plate facing and in alignment with said grooves in said drum, means for disposing said plates in angular relation to said drum to bring a pair of opposed pressure pads towards an aligned groove therebetween to exert a compacting force on a filter tip assembly in said groove, a pair of bushings on said shaft having a flange extending therefrom, and a plurality of pins fixed to said flange and passing through a respective one of said plates to fixedly mount said plate for rotation with said shaft.

19. The combination as set forth in claim 18 which further includes a pair of bearings on opposite sides of said drum, each bearing having an inner race fixed to a respective bushing and an outer race universally mounted on said inner race, each said plate being fixedly mounted on a respective outer race of said bearings for pivoting relative to said flange longitudinally of said pins passing therethrough.

20. The combination as set forth in claim 18 which further includes a plurality of springs on each side of said drum, each spring being secured at the ends to a respective plate and a respective flange to permit resilient pivoting of each plate relative to said drum.

21. In combination with a rotatable shaft, a filter drum mounted on a longitudinal axis of said shaft and having a plurality of circumferentially spaced peripheral grooves for receiving filter tip assemblies therein; an apparatus for compacting a filter tip assembly in at least one of said grooves comprising a pair of plates coaxially of said drum and fixedly mounted relative to said shaft rotate simultaneously with said drum, a plurality of circumferentially spaced pressure pads on each plate facing and in alignment with said grooves in said drum, means for disposing said plates in angular relation to said drum to bring a pair of opposed pressure pads towards an aligned groove therebetween to exert a compacting force on a filter tip assembly in said groove, a pair of bearings of opposite sides of said drum, each bearing having an inner race fixed to said shaft and an outer race universally mounted on said inner race, each said plate being fixedly mounted on a respective outer race of said bearings, and a pair of pins, each passing between a respective inner race and an outer race thereon to fixedly secure said outer race to said inner race for rotation therewith.

* * * * *